(12) United States Patent
Andrees et al.

(10) Patent No.: US 7,005,598 B2
(45) Date of Patent: Feb. 28, 2006

(54) PROCESS FOR PRODUCING A FIBER-REINFORCED SEMIFINISHED PRODUCT IN THE FORM OF METAL STRIPS, METAL SHEETS OR THE LIKE AND APPARATUS FOR CARRYING OUT THE PROCESS

(75) Inventors: Gerhard Andrees, Munich (DE); Heiko Fietzek, Pfrien (DE); Falko Heutling, Munich (DE); Bertram Kopperger, Hebertshausen (DE); Juergen Wehr, Ottobrunn (DE)

(73) Assignees: DaimlerChrysler AG, Stuttgart (DE); MTU Aero Engines GmbH, Munich (DE)

( * ) Notice: Subject to any disclaimer, the term of this patent is extended or adjusted under 35 U.S.C. 154(b) by 317 days.

(21) Appl. No.: 10/412,053

(22) Filed: Apr. 11, 2003

(65) Prior Publication Data

US 2004/0020904 A1 Feb. 5, 2004

(30) Foreign Application Priority Data

Apr. 11, 2002 (DE) .......................................... 102 15 999

(51) Int. Cl.
*B23K 26/32* (2006.01)
*B23K 26/20* (2006.01)

(52) U.S. Cl. ............................ 219/121.14; 219/121.64; 219/121.66

(58) Field of Classification Search ............ 219/121.14, 219/121.35, 121.64, 121.66, 121.85; 228/190; 164/494, 91, 108–110
See application file for complete search history.

(56) References Cited

U.S. PATENT DOCUMENTS

| | | | |
|---|---|---|---|
| 3,841,942 A | | 10/1974 | Carlson et al. |
| 3,900,150 A | * | 8/1975 | Delgrosso et al. .......... 428/608 |
| 3,970,136 A | * | 7/1976 | Cannell et al. ............. 164/108 |
| 4,499,156 A | | 2/1985 | Smith et al. |
| 4,733,816 A | | 3/1988 | Eylon et al. |
| 5,101,542 A | * | 4/1992 | Nakagawa et al. ........... 28/282 |

* cited by examiner

*Primary Examiner*—Samuel M. Heinrich
(74) *Attorney, Agent, or Firm*—Kenyon & Kenyon (57) ABSTRACT

A process for is producing a fiber-reinforced semifinished product in the form of metal strips, metal sheets etc., from at least one layer of fibers which includes a number of long to endless reinforcing fibers spaced apart from one another and arranged in parallel and a metal. A metal jacket applied to the reinforcing fiber by a PVD process (physical vapor deposition) may act for example as the metal. At least certain regions of the metal and the reinforcing fibers run through a welding process in which a bonding takes place by planar melting of the metal to form a matrix surrounding the reinforcing fibers.

17 Claims, 7 Drawing Sheets

PROCESS FOR PRODUCING A FIBER-REINFORCED SEMIFINISHED PRODUCT IN THE FORM OF METAL STRIPS, METAL SHEETS OR THE LIKE AND APPARATUS FOR CARRYING OUT THE PROCESS

CROSS-REFERENCE TO RELATED APPLICATIONS

The present application claims priority to Application No. 102 15 999.8, filed in the Federal Republic of Germany on Apr. 11, 2002, which is expressly incorporated herein in its entirety by reference thereto.

FIELD OF THE INVENTION

The present invention relates to a process for producing a fiber-reinforced semifinished product in the form of metal strips and metal sheets, etc., and to an apparatus for carrying out the process.

BACKGROUND INFORMATION

A process of this type for producing fiber-reinforced foils, sheets or strips with a metal matrix is described in U.S. Pat. No. 4,733,816 and U.S. Pat. No. 4,499,156. In this case, the metal matrix is hot-pressed between and onto the fibers by an apparatus as described in U.S. Pat. No. 3,841,942. Silicon carbide fibers, silicon-coated silicon carbide fibers, silicon-carbide-coated boron fibers or boron-carbide-coated boron fibers are used as the fibers. Exclusively available as the matrix metal are titanium-based alloys.

The components finally produced from fiber-reinforced foils, sheets or strips are also referred to as metal-matrix components (MMCs).

The conventional process for producing fiber-reinforced foils, sheets or strips has the disadvantage that it is relatively complex, since it may require a number of steps for building up the fiber/foil structure. Furthermore, the attainable fiber volume content and the resulting mechanical properties are limited, since the densest arrangement of fibers cannot be achieved. Moreover, the distance between the fibers cannot be kept constant and the possibility of fibers touching and breaking cannot be ruled out. The deliberate alignment of the fibers in the required directions is possible only to a limited extent. This leads, inter alia, to fatigue cracks, lower break resistance and a shorter service life of the MMCs produced from the fiber-reinforced foils/sheets.

It is an object of the present invention to provide a process and an apparatus for producing a fiber-reinforced semifinished product in the form of metal strips, metal sheets, etc. such that, while avoiding the disadvantages mentioned, a low-cost process in which the reinforcing fibers are brought into a predetermined exact arrangement within the matrix of the semifinished product may be provided.

SUMMARY

The above and other beneficial objects of the present invention may be achieved by providing a method and apparatus as described herein.

An example embodiment of the present invention is based on the perception that the reinforcing fibers and a metal forming the later matrix of the semifinished product may be brought into a predetermined permanent arrangement in a simple manner by a welding process.

According to an example embodiment of the present invention, therefore, at least certain regions of a metal and the reinforcing fibers run through a welding process in which a bonding takes place by planar melting of the metal to form a matrix surrounding the reinforcing fibers.

According to an example embodiment of the present invention, the welding of the reinforcing fibers takes place such that the metal of one reinforcing fiber is welded to the metal of a further reinforcing fiber or to the matrix of reinforcing fibers already bonded together.

According to another example embodiment of the present invention, the metal of a number of reinforcing fibers arranged in parallel next to one another is simultaneously welded together in one process step.

The welding may in this case take place both continuously, in certain regions or at certain points.

An energy-beam welding process, such as a laser welding process or an electron-beam welding process, etc. may be used as the welding process. These are standard welding processes which may reduce the production costs considerably.

To avoid chemical reactions in the matrix with oxygen ($O_2$), nitrogen ($N_2$), etc., in particular, at least the welding process takes place in an atmosphere without reactive gases, such as a vacuum in the case of electron-beam welding, an inert-gas atmosphere in the case of laser-beam welding, etc.

Before the welding process, the reinforcing fiber may be provided with a metal jacket, for example, by the PVD process, which after the welding operation at least partly forms the metal of the matrix.

To provide a semifinished product with adequate matrix material, according to a further example embodiment of the present invention, before the welding process a number of reinforcing fibers having a metal jacket are arranged in parallel next to one another between two metal foils. Uniform melting of the metal jacket of the reinforcing fibers and of the metal foils may be ensured by use of the same metal for the metal jacket and the metal foil.

As an alternative to this, before the welding process a number of reinforcing fibers are arranged in parallel between two metal foils, an additional metal wire also being respectively introduced between the individual reinforcing fibers. This arrangement may provide that it is possible to dispense with the prior application of a metal jacket onto the reinforcing fiber. Uniform melting of the metal foil and metal wire may be ensured by use of the same metal for the metal foil and the metal wire.

After the welding operation, a consolidation of the semifinished product may take place, to ensure a homogeneous matrix.

The consolidation may take place for example by hot-isostatic pressing and by uniaxial hot pressing.

In principle, all weldable metals/metal alloys come into consideration as the metal, in particular, titanium and titanium-based alloys.

All types of fiber may be used as reinforcing fibers. The reinforcing fibers in this case may substantially include the elements silicon (Si), carbon (C), boron (B), oxygen (0), aluminum (Al) and/or nitrogen (N).

Further aspects and features are described below with reference to example embodiments of the present invention and in conjunction with the drawings.

DETAILED DESCRIPTION

Figure 1:
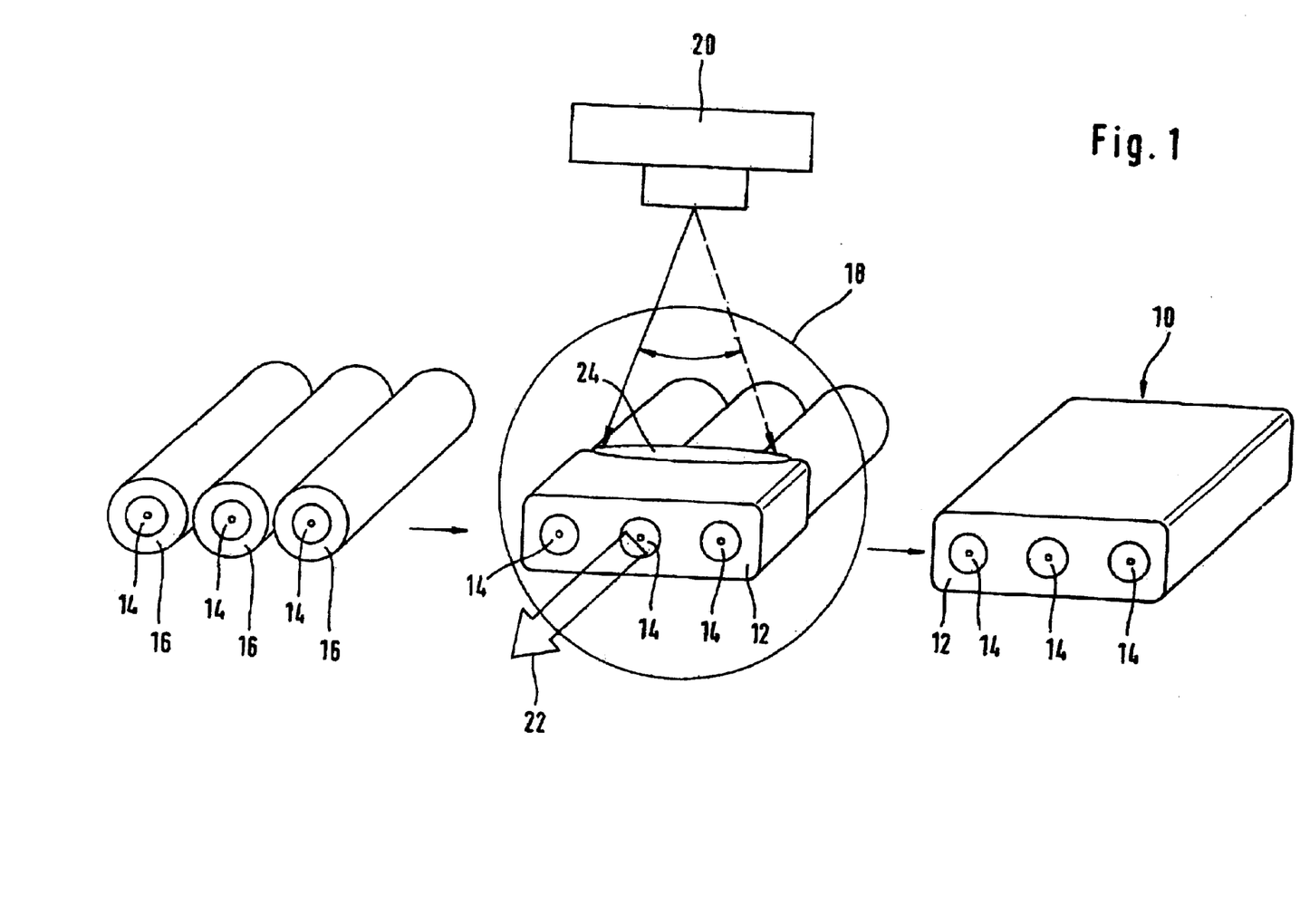
FIG. 1 is a schematic view of the basic production of a semifinished product from a number of reinforcing fibers with a metal jacket.

In FIG. 1, the production of a semifinished product 10 in the form of a single layer of reinforcing fibers 14 bonded by a matrix 12 of metal is illustrated in a schematic representation. The reinforcing fibers 14 have been provided by a PVD process (PVD=physical vapor deposition) with a metal jacket 16, which forms the material of the later matrix 12. The metal jacket 16 has a substantially equal thickness in cross-section.

A number of reinforcing fibers 14 with a metal jacket 16 are then brought together, closely alongside one another, in a region 18, in which there prevails an atmosphere without reactive gases with regard to the metal of the metal jacket 16 and the matrix 12. For the sake of an overview, only three reinforcing fibers are illustrated in FIG. 1.

Operating in this region 18 is a beam gun 20, which bonds together the reinforcing fibers 14, moved in the direction of advancement 22, by their metal jacket 16 in a welding region 24 by an energy-beam welding process. In the welding region 24, the metal surrounding the reinforcing fibers 14 is melted, so that the matrix 12 is formed. In the present exemplary embodiment, the reinforcing fibers 14 are subsequently bonded together along their entire length by the matrix 12 and aligned in a predetermined arrangement in the matrix 12, that is at regular intervals and parallel to one another.

An energy-beam welding process, a laser welding process or an electron-beam welding process, etc. may be used as the welding process. The atmosphere is a vacuum in the case of electron-beam welding or an inert-gas atmosphere in the case of laser-beam welding.

Oxidation and soiling of the matrix 12 may be avoided by this atmosphere.

Figure 2:
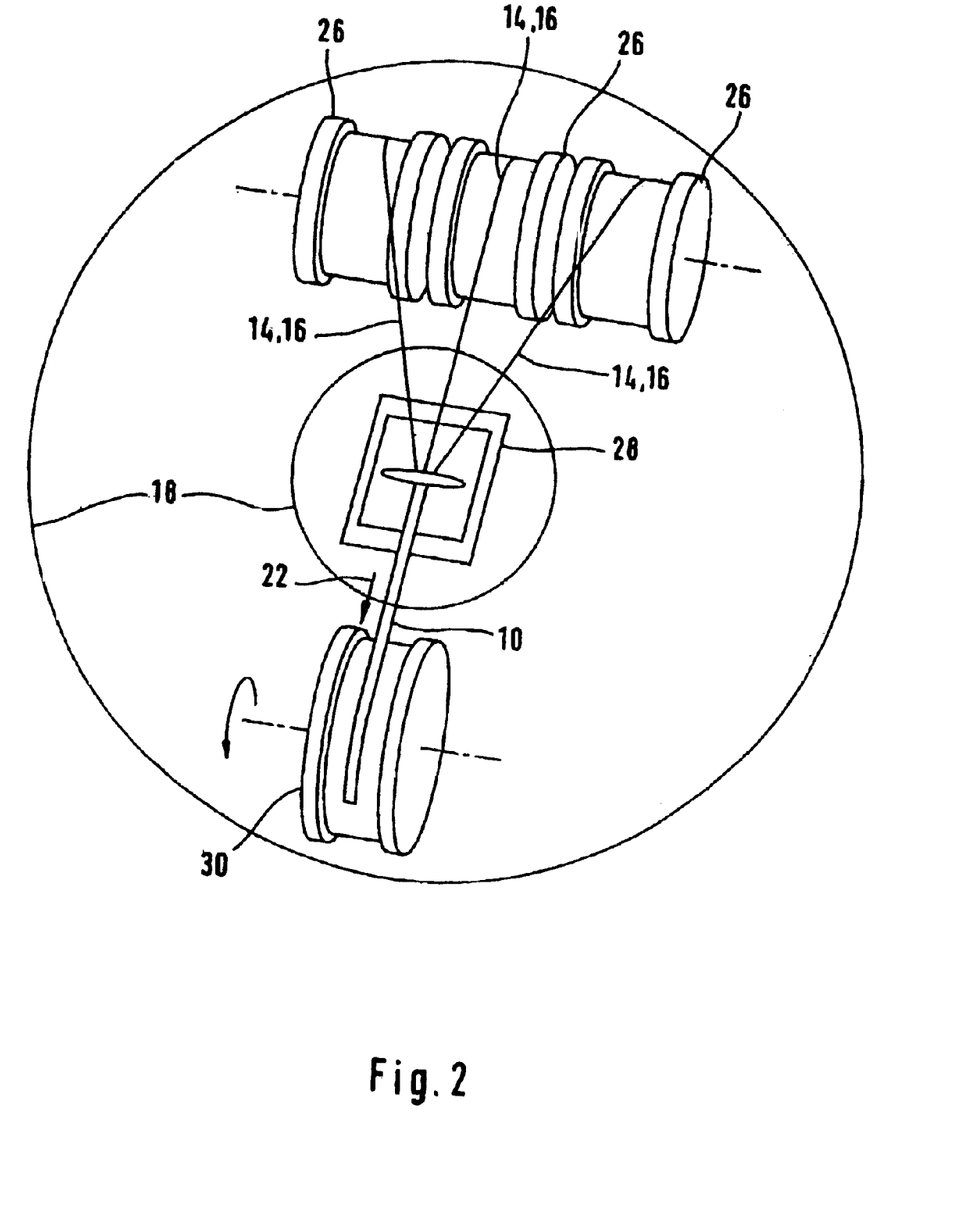
FIG. 2 is an overview of the representation of the production process illustrated in FIG. 1.

In FIG. 2, the feeding of the reinforcing fibers 14, having a metal jacket 16, into the welding region 24 is illustrated.

The reinforcing fibers 14 having a metal jacket 16 are drawn off from rollers 26 and fed to a guiding device 28, in which the welding region 24 is also located. After the welding process, the semifinished product 10 produced is wound up onto a further roller 30 for storage and transport.

The region 18 with an atmosphere without reactive gases may in this case include the guiding device 28 with the welding region 24 or else the entire process from the unwinding of the reinforcing fibers 14, having a metal jacket 16, from the rollers 26 via the guiding device 28 to the winding up of the semifinished product 10 onto the roller 30.

Figure 3:
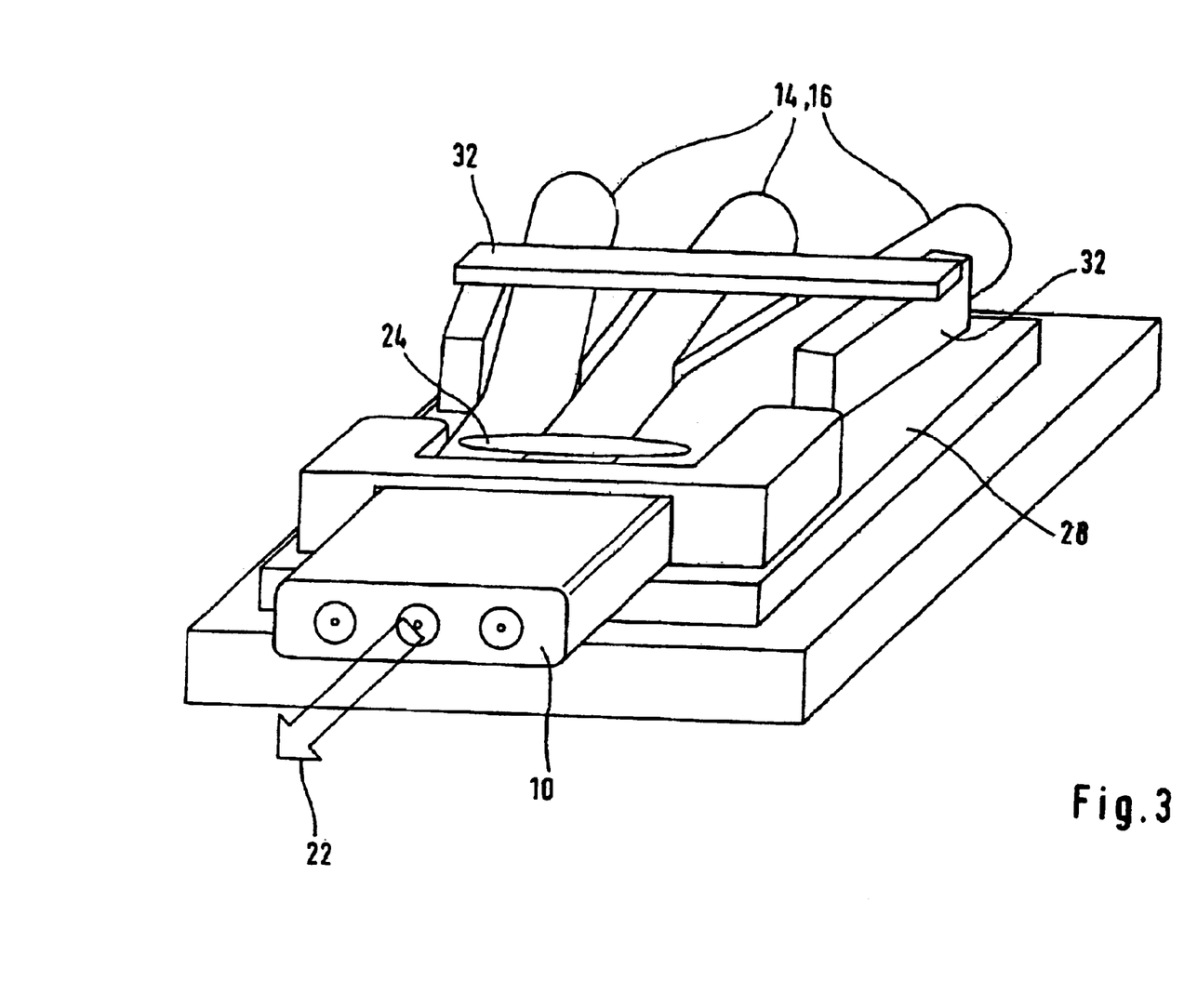
FIG. 3 is a view of a detail illustrated in FIG. 2.

In FIG. 3, the guiding device 28 is illustrated in detail. The guiding device 28 has guiding bars 32, with the aid of which the reinforcing fibers 14, having a metal jacket 16, are guided in a deliberately directed manner into the welding region 24. The guiding device 28 may be cooled, as and when required, in order to subject the reinforcing fibers 14 to as little heat as possible.

Figure 4:
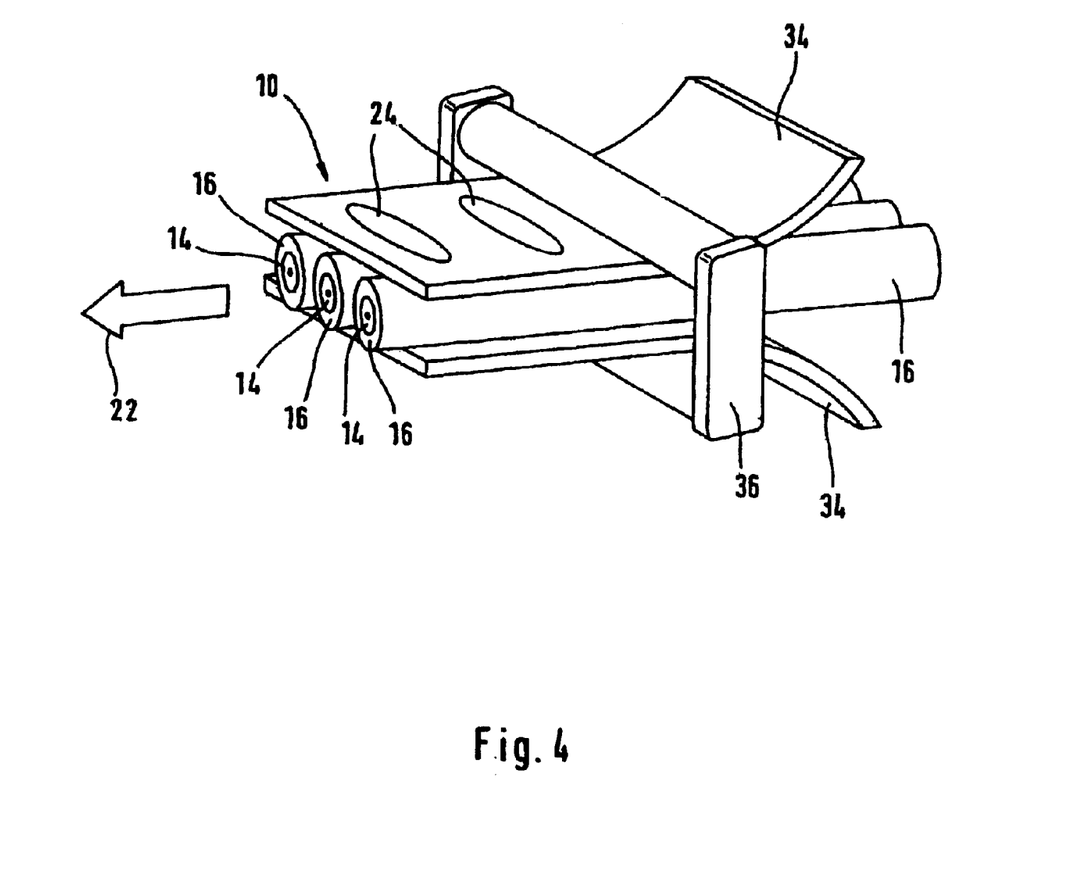
FIG. 4 illustrates a second example embodiment for the production of a semifinished product from a number of reinforcing fibers with a metal jacket and metal foils.

In FIG. 4, a further example embodiment of the present invention is illustrated. A semifinished product 10 is produced from a number of reinforcing fibers 14, arranged in parallel and having a metal jacket 16, and two metal foils 34. The metal of the metal jacket 16 corresponds in this case to the metal of the metal foils 34. The entire arrangement is fed to a guiding device 36, in which the metal foils 34 and the metal jackets 16 of the reinforcing fibers 14 are welded together. The melted metal of the metal foils 34 and of the metal jackets 16 of the reinforcing fibers form the matrix 12 of the semifinished product. To obtain a homogeneous matrix 12 of the semifinished product 10, a consolidation may be carried out, for example by hot-isostatic pressing, as a further working step.

Figure 5:
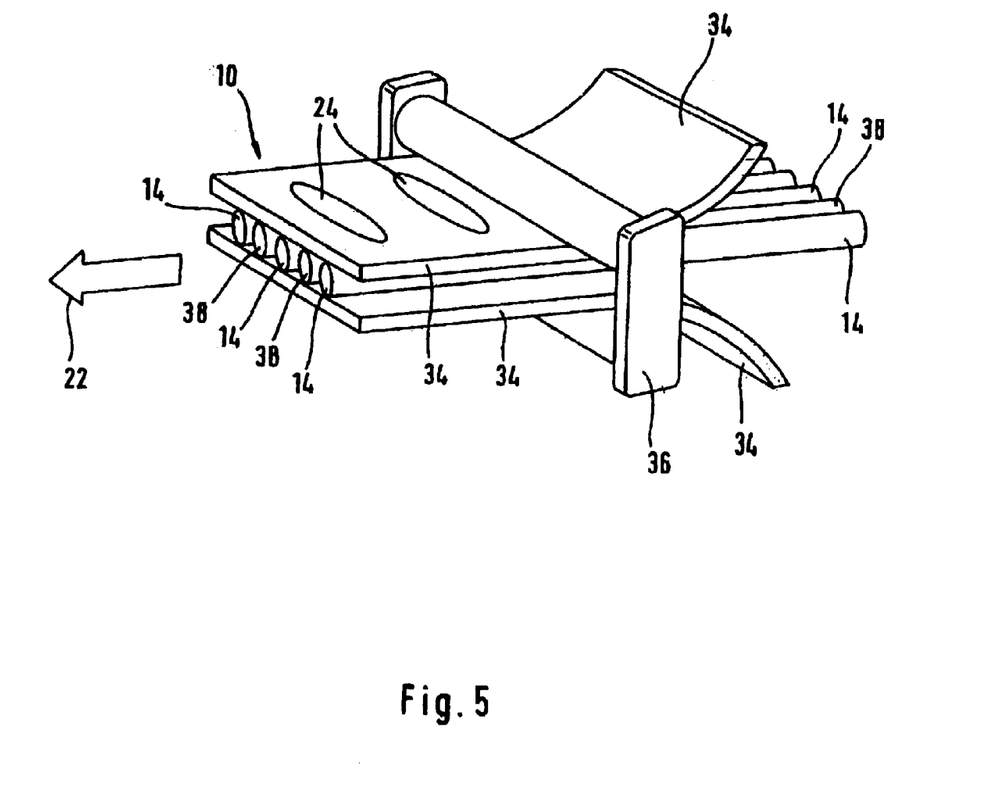
FIG. 5 illustrates a third example embodiment for the production of a semifinished product from a number of reinforcing fibers, metal wires and metal foils.

A further example embodiment is illustrated in FIG. 5. By contrast with the previous exemplary embodiment, reinforcing fibers 14 and metal wires 38 are alternately introduced between the two metal foils 34. The entire arrangement, that is the metal foils 34, reinforcing fibers 14 and metal wires 38, is in turn fed to a guiding device 36 and subsequently welded, the matrix 12 being formed by fusing of the metal wires 38 and the metal foils 34 introduced between the reinforcing fibers 14. Prior coating of the reinforcing fibers 14 with a metal jacket 16 may no longer be required.

Figure 6:
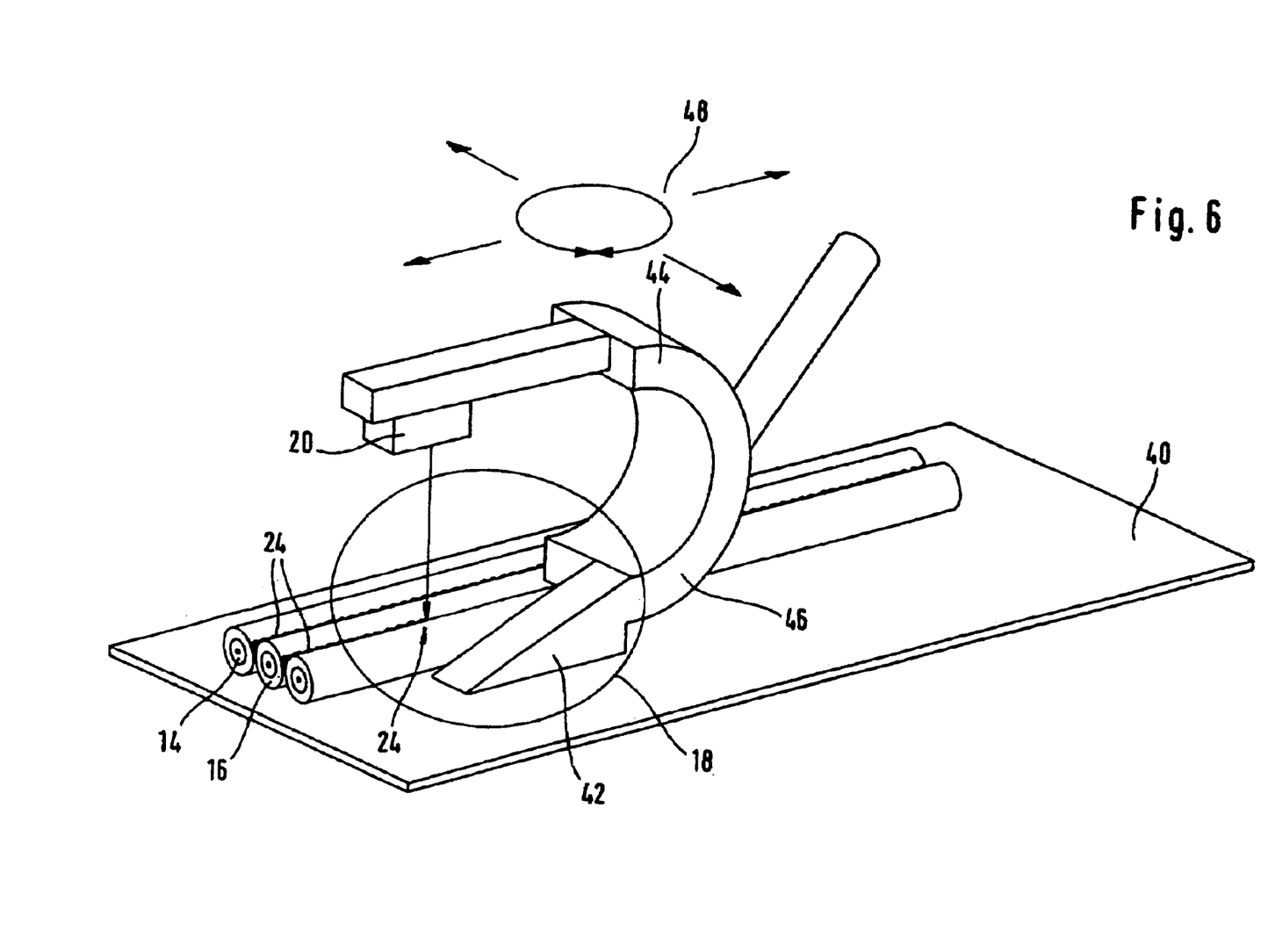
FIG. 6 illustrates an apparatus for welding and depositing individual reinforcing fibers with a metal jacket next to further reinforcing fibers already bonded by a matrix.

The subject of FIG. 6 is an apparatus for welding and depositing the reinforcing fibers 14. The apparatus in this case includes a rest 40, an arrangement 42 for guiding a reinforcing fiber 14, a beam gun 20, fastened on a frame 44, and a further arrangement for ensuring replenishment of the fibers. The frame 44 of the beam gun 20 and the arrangement 42 for guiding a reinforcing fiber 14 in this case form a structural unit 46, which is movable in relation to the rest 40. The possibility of relative movement of the structural unit 46 with respect to the rest 40 is illustrated in FIG. 6 by the arrows 48. The welding of the reinforcing fibers 14 with the metal jacket 16 takes place in this case spatially next to the further reinforcing fibers 14 which have already been placed on the rest 40 and bonded by a matrix 12. On account of the possibility of relative movement by a drive between the rest 40 and the structural unit 46, it is then possible to realize various complicated depositing geometries in 2D and 3D. This produces a fiber-reinforced semifinished product 10, which may be removed from the rest 40 and processed further.

Figure 7:
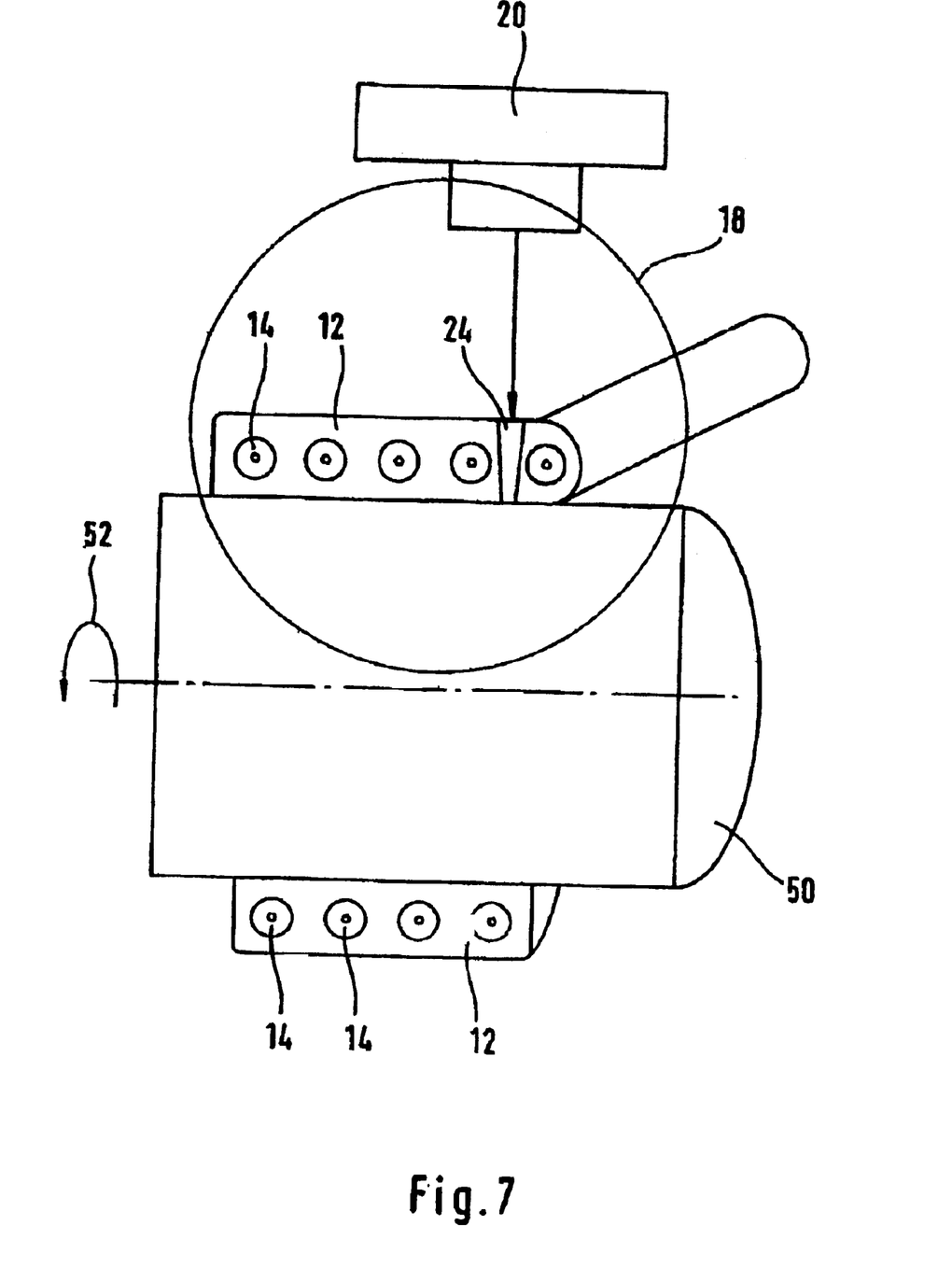
FIG. 7 illustrates a further possibility for depositing the semifinished product produced according to FIG. 6.

A further exemplary possibility for depositing the semifinished product 10 is illustrated in FIG. 7. The welding on of further reinforcing fibers 14 with a metal jacket 16 takes place in turn spatially next to the reinforcing fibers 14 which have already been bonded together by a matrix 12. The rest 40 for depositing the semifinished product 10 is in this case formed by a rotationally symmetrical body 50, which rotates in a manner corresponding to arrow 52. As a result, winding up of the semifinished product 10 onto the body of rotation 50 takes place. The semifinished product 10 may in this case be deposited both as a single layer and as multiple layers.

What is claimed is:

1. A process for producing a fiber-reinforced semifinished product in the form of one of a metal strip and a metal sheet from at least one layer of fibers including a plurality of long to endless reinforcing fibers spaced apart from one another and arranged in parallel and a metal surrounding the reinforcing fibers at least in certain regions, comprising:

performing a welding process on at least the certain regions of the metal with the reinforcing fibers in which a bonding occurs by planar melting of the metal to form a matrix surrounding the reinforcing fibers.

2. The process according to claim 1, wherein the welding process includes welding the metal of one reinforcing fiber one of to the metal of another reinforcing fiber and to the matrix of reinforcing fibers already bonded together.

3. The process according to claim 1, wherein the welding process includes welding the metal of a plurality of reinforcing fibers arranged in parallel next to one another in one process step.

4. The process according to claim 1, wherein the welding process includes at least one of an energy-beam welding process, a laser welding process and an electron-beam welding process.

5. The process according to claim 1, wherein the welding process is performed in an atmosphere without reactive gases.

6. The process according to claim 1, wherein the welding process includes at least one of an electron-beam welding process performed in a vacuum and a laser-beam welding process performed in an inert-gas atmosphere.

7. The process according to claim 1, further comprising providing the reinforcing fiber with a metal jacket before the welding process, the metal of the metal jacket forming the metal of the matrix after the welding process.

8. The process according to claim 7, wherein the metal jacket is provided in the providing step by a physical vapor deposition process.

9. The process according to claim 1, further comprising arranging the reinforcing fibers having a metal jacket between two metal foils before the welding process, the metal jacket of the reinforcing fibers and the metal foils forming the metal of the matrix after the welding process.

10. The process according to claim 9, wherein the metal of the metal foil corresponds to the metal of the metal jacket.

11. The process according to claim 1, further comprising:

arranging the reinforcing fibers between two metal foils before the welding process; and introducing a metal wire between the reinforcing fibers before the welding process;

wherein the metal foils and the metal wire form the metal of the matrix after the welding process.

12. The process according to claim 11, wherein the metal of the metal foil corresponds to the metal of the metal wire.

13. The process according to claim 1, wherein the metal of the matrix includes a weldable metal.

14. The process according to claim 1, wherein the metal of the matrix includes titanium.

15. The process according to claim 1, wherein the reinforcing fibers include at least one of silicon, carbon, boron, oxygen, aluminum and nitrogen.

16. The process according to claim 1, further comprising consolidating the semifinished product after the welding process.

17. The process according to claim 16, wherein the consolidating includes at least one of a hot-isostatic pressing process and a uniaxial hot pressing.

* * * * *